Feb. 16, 1937.  L. E. ROOT  2,070,809
CONTROL SURFACE
Filed Aug. 28, 1935  3 Sheets-Sheet 1
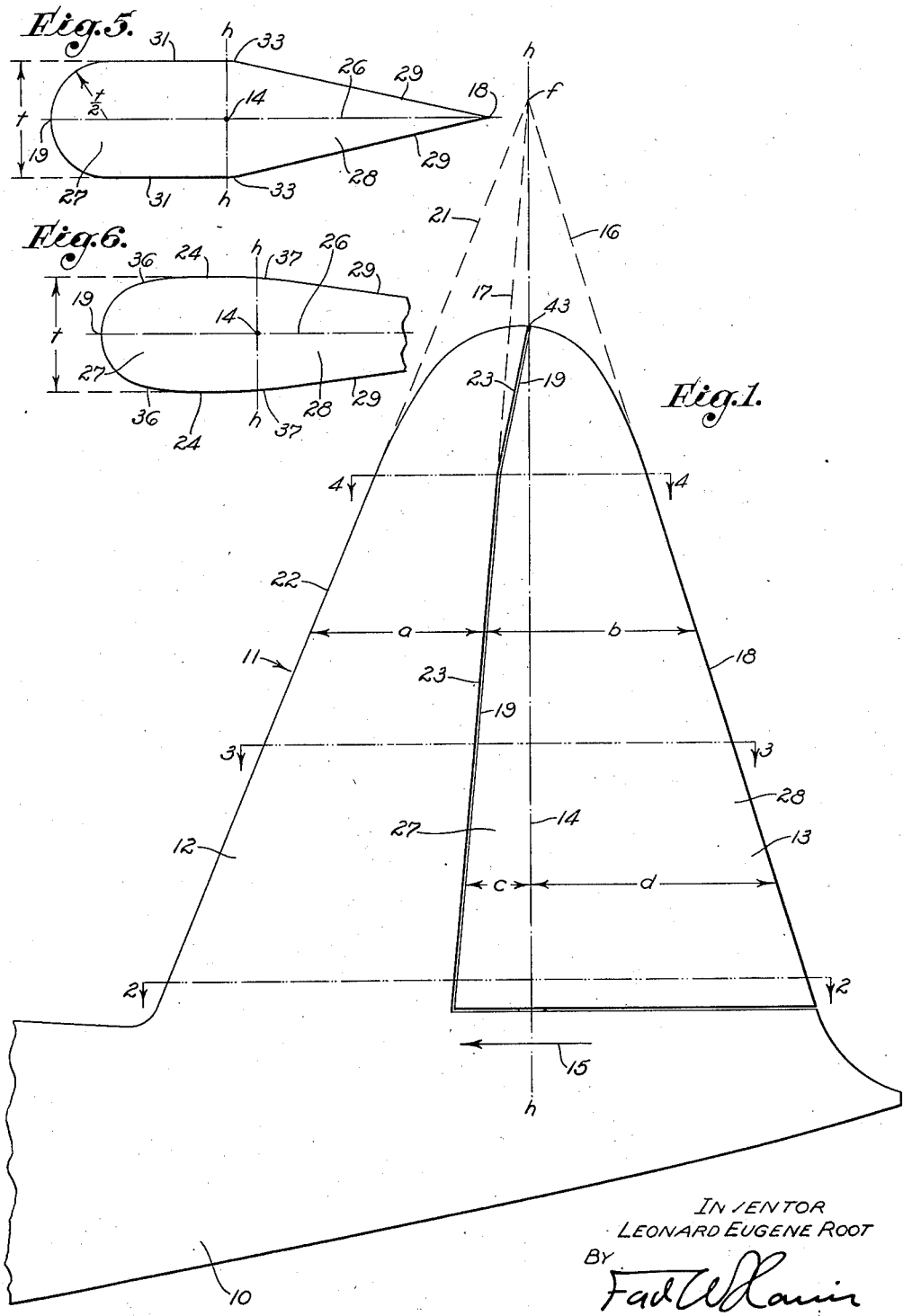
INVENTOR
LEONARD EUGENE ROOT
BY
ATTORNEY.

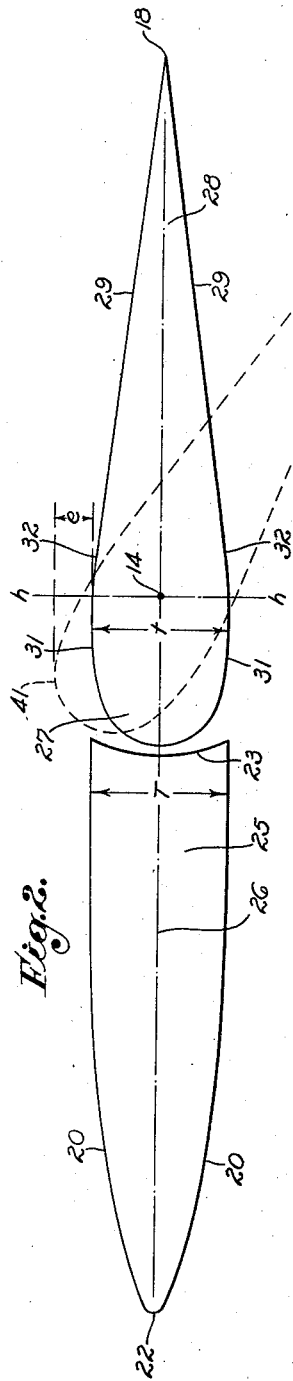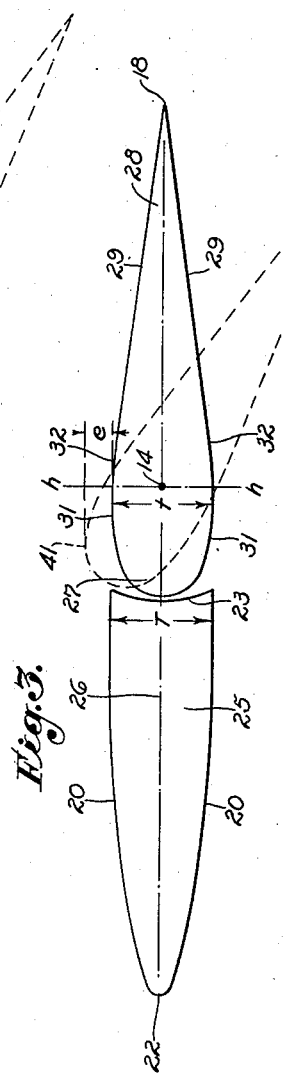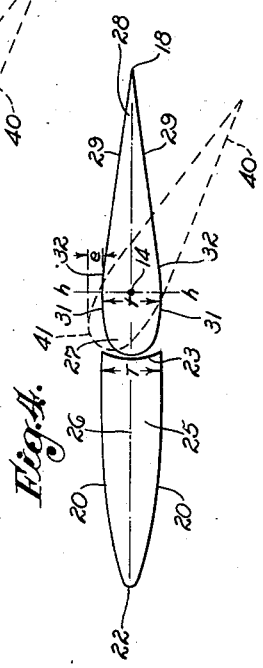

Feb. 16, 1937.   L. E. ROOT   2,070,809
CONTROL SURFACE
Filed Aug. 28, 1935   3 Sheets-Sheet 3

CONVENTIONAL DESIGN   DESIGN OF MY INVENTION

CONVENTIONAL DESIGN   DESIGN OF MY INVENTION

CONVENTIONAL DESIGN   DESIGN OF MY INVENTION

INVENTOR
LEONARD EUGENE ROOT
BY
ATTORNEY.

Patented Feb. 16, 1937

2,070,809

UNITED STATES PATENT OFFICE 2,070,809

CONTROL SURFACE

Leonard Eugene Root, Santa Monica, Calif., assignor to Douglas Aircraft Company, Inc., Santa Monica, Calif., a corporation of Delaware Application August 28, 1935, Serial No. 38,190

21 Claims. (Cl. 244—87)

My invention relates to surface control means for aerial vehicles, and relates in particular to control means especially adapted for use on high speed airplanes.

A problem with which the airplane designer has been confronted may be referred to as oscillation or "hunting", consisting of rotation of the airplane back and forth through small angles on either side of an intended forward line or direction of travel through the air; or rotation through small angles either side of the horizontal or vertical planes; or any combination of horizontal and vertical plane rotation.

There are two fundamental causes of oscillations which appear in the flight of an airplane. One cause is a deficiency in vertical or horizontal control surface area and is commonly known as instability, and can be corrected only by an addition to the control surface area. The other cause is an inherent undesirable characteristic of the control surface generally employed in the art, particularly the movable surface, which produces oscillation or hunting in the movable control surface itself, which in turn produces oscillation of the airplane.

It is an object of my invention to provide a means for control which will eliminate this oscillation in the movement of an aerial vehicle.

A further object of my invention is to provide a control surface incorporating the features of my invention in which there is no oscillation of the movable control surface.

Practically all aircraft movable control surfaces, particularly those of large size, require some method of balancing aerodynamically, that is, some method to reduce the moment about the hinge line required to rotate them from their neutral position. This is usually accomplished by adding some area forward of the hinge line upon which the air may act, tending to reduce the hinge moment. Up to the present time this balance area forward of the hinge has been relatively ineffective at and near the neutral position, with increasing effectiveness as the angle between the fixed and movable surface is increased. This condition has in general been unsatisfactory since, in order to get sufficient balance near neutral, the surface was excessively balanced with a tendency toward overbalance at high angles.

An object of my present invention is to provide a movable control surface which is aerodynamically balanced and in which the percentage of effective balance tends to remain constant with the increase in angular position of the control surface.

It is a further object of my invention to provide a control surface in which the balancing force at small angular positions thereof is substantial and in which the balance force in large angular positions is not abnormally large.

In previous designs of control surfaces the top or outer end balance portion has been so constructed as to be in the airstream, thus allowing ice to collect on the leading edge of the balance portion of the movable surface. The airfoil section is thus changed and overbalance may occur.

It is a further object of the present invention to provide a control means of the character described, having a stationary airfoil and a movable airfoil set in leading and following relation, these airfoils being so formed that ice will not readily accumulate on the movable airfoil during cold weather flying.

Further objects and advantages of the invention will be evident throughout the following part of the specification.

The preferred embodiments of my invention include my invention in its entirety. All of the features and advantages of my invention cooperate to produce a control means which I believe to be superior to those of the prior art, and all of which cooperate to produce a new and patentable combination. Certain of the features, however, are capable of independent use or of use with other features of the invention less than the invention in its entirety. Although when the invention in its entirety is not employed the valuable results and advantages are not equal to those when the invention is employed in its entirety, yet the results obtainable are superior to those obtainable by prior art structures. I therefore do not wish my invention to be limited to the entire combination but wish my patent protection to extend not only to the combination as a whole but to the various elements and sub-combinations which I have produced.

For the purpose of illustrating my invention, I shall hereinafter describe a directional control surface which incorporates all the features of my invention. It should be understood that my invention, which I believe to be broadly new both in its entirety and in its several features susceptible of independent use, is not limited to this one use, but may be incorporated in other control surfaces.

Referring to the drawings, which are for illustrative purposes only, and which show only the outlines or profile of the parts for the reason that the present invention is not concerned with the internal structure of such parts but only with the aerodynamic characteristics due to the external form thereof, Fig. 1 is a diagrammatic elevational view disclosing an airplane rudder constituting one of the control means of an aerial vehicle, in which the principles of the present invention may be embodied.

Fig. 2 is a section on a plane indicated by the line 2—2 of Fig. 1.

Fig. 3 is a section taken on a plane indicated by the line 3—3 of Fig. 1.

Fig. 4 is a section on a plane indicated by the line 4—4 of Fig. 1.

Fig. 5 is a schematic view exaggerating the essential characteristics of the movable airfoil cross section.

Fig. 6 is a view similar to Fig. 5, showing the slight departure from Fig. 5 in actual practice.

Figure 7:
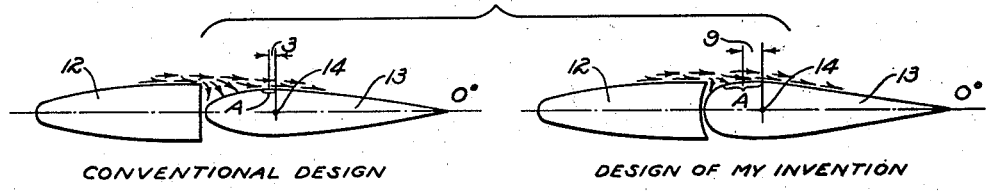
Figure 8:
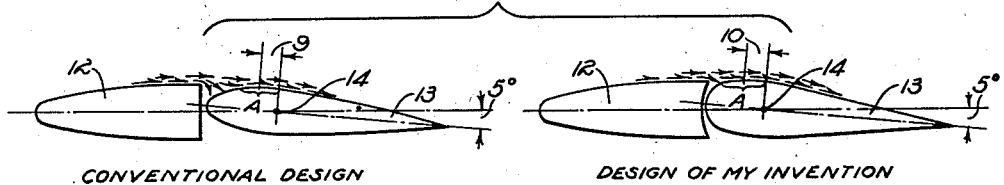
Figure 9:
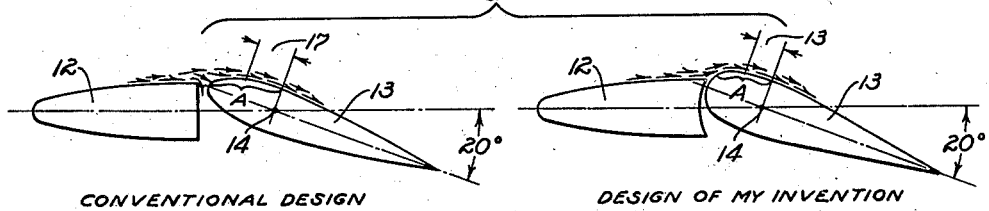

Figs. 7, 8, and 9 are diagrammatic views comparing the control means of my invention with the conventional design in the prior art in order to illustrate how my invention is markedly superior over the prior art.

Figure 10:
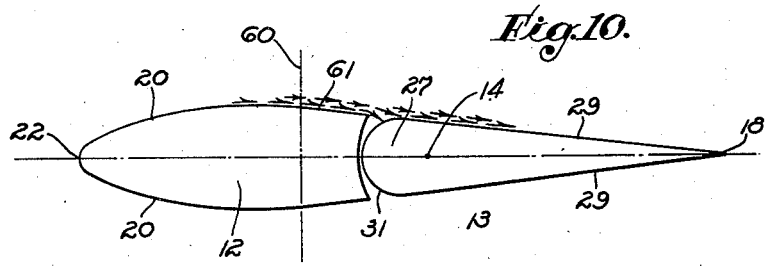

Fig. 10 is a diagrammatic sectional view taken through a control means incorporating in the stationary airfoil a means for conditioning the air before it reaches the movable airfoil.

In Fig. 1, I show a body portion 10 of an aerial vehicle, namely, the tail of an airplane fuselage, from which a control means 11 is projected upwardly, this control means consisting of a front or stationary airfoil 12 and a rear or movable airfoil 13. In the form of the control means shown the movable airfoil 13 is hinged on a vertical axis 14, or, in other words, on an axis which extends substantially perpendicular with relation to the forward line of movement indicated by the arrow 15. One of the features of the invention resides in the maintaining of predetermined proportions in chordal dimensions throughout the control member regardless of the change in size or cross-sectional area or airfoil section of the control member on different parallel planes taken through the control member in longitudinal direction or in a direction of movement of the vehicle in flight. These planes may also be identified as extending through the airfoil substantially parallel to the direction of flight and substantially perpendicular to, or at right angles to, the hinge plane. This feature is especially important in the forming of the movable airfoil 13 and is desirable in the formation of the stationary airfoil 12 although the importance thereof in the stationary airfoil 12 may not be so pronounced. In Fig. 1 it will be noted that lines 16 and 17 constituting projections of the trailing and leading edges 18 and 19 of the movable airfoil 13 meet the hinge axis 14 at a common point $f$. In a like manner, a line 21 constituting a projection of the leading edge 22 of the stationary airfoil 12 leads to the point $f$.

In Fig. 1, $a$ indicates the depth of the stationary airfoil 12, that is, the distance from the leading edge 22 thereof to the trailing edge 23, this depth $a$ being variable from the plane 2—2 to the plane 4—4. The depth of the rear or movable airfoil 13 is indicated by $b$, and the front and rear portions of the movable airfoil 13, forward of and rearward of the hinge axis 14, are indicated by $c$ and $d$. In view of the fact that the edges 18, 19, and 22 of the members 12 and 13 are positioned so as to be projected through a common point $f$, the dimensions $a$, $b$, $c$, and $d$ will proportionately vary from the plane 2—2 to the plane 4—4. Above or outside the plane 4—4, the ends of the members 12 and 13 are rounded as shown so as to avoid the necessity of a sharp point which would occur if the edges were carried all the way to the point $f$. Assuming that $aP$, $bP$, $cP$ and $dP$ represent the actual length of the dimensions $a$, $b$, $c$, and $d$ in any longitudinal plane through the control means, such as the plane 2—2, for example, and $ap$, $bp$, $cp$, and $dp$ indicate these dimensions in another horizontal plane through the control means 11, such as either the plane 3—3 or the plane 4—4, or an intermediate plane, the following proportions will always be maintained:

$$\frac{aP}{ap}=\frac{bP}{bp}=\frac{cP}{cp}=\frac{dP}{dp}$$

That is to say, as any one of these dimensions is increased, all of the other dimensions will be likewise proportionately increased when taken in the same plane. In other words, the portions of the airfoils are varied proportionately in cord from one cross-sectional plane through the airfoils extending substantially parallel to the direction of flight, and substantially perpendicular to the hinge plane, to other such planes. In the preferred embodiment of my invention, the thicknesses $T$ and $t$ shown in Figs. 2, 3 and 4 are varied in the same proportion from the plane 2—2 to the plane 4—4 with the result that the cross-sectional area or airfoil section is varied proportionately from one cross-sectional plane through said airfoil, extending substantially parallel to the direction of flight, and substantially perpendicular to the hinge plane, to other such planes. It should be understood, however, that the invention is not to be limited to proportionately varying the thicknesses $T$ and $t$, and that such proportioning is only preferred, since superior results are obtained by using this feature of my invention. The leading edge 22 of the stationary airfoil 12 as shown in the sections Fig. 2, Fig. 3, and Fig. 4, and the side faces 20 are streamlined rearwardly to the variable thickness $T$ so that at the rearward or trailing portion 25 of the stationary airfoil 12, the side faces 20 are parallel to longitudinal center lines 26 which pass through the stationary and movable airfoils 12 and 13. The trailing edge 23 of the stationary airfoil 12 constitutes a face which is nearly flat but is preferably concavely curved as shown in Figs. 2 to 4 inclusive.

For the purpose of description and explanation, Figs. 2 to 4 inclusive indicate a hinge plane $h$—$h$ consisting of a vertical plane coinciding with the hinge axis 14 and being perpendicular to the axes 26 of the members 12 and 13. This hinge plane $h$—$h$ divides the movable airfoil 13 into front and rear portions 27 and 28. The front portion 27 is relatively blunt, although it may be rounded at the front or leading edge thereof, and the side faces 29 of the rear portion 28 converge to the trailing edge 18 without convex or concave curvature in longitudinal direction. In the preferred practice of the invention the faces 29 are flat from the trailing edge 18 to substantially the hinge plane h—h where the faces 29 may join the faces 31 of the front portion 27 through the use of curved surfaces 32 which are substantially centralized on the hinge plane h—h. The essential characteristics of the movable airfoil cross section are shown in the schematic Fig. 5. The side faces 31 of the front portion 27 are parallel to the center line 26 in longitudinal direction and converge upwardly toward the upper or outer end of the movable airfoil 13. The leading edge 19 is formed by semi-circular curves on a radius equal to $$\frac{t}{2}$$

The side faces 29 of the rear portion 28 extend straight from the hinge axis h—h to the trailing edge 18. Accordingly, when the movable airfoil 13 is in neutral position, that is, in alignment with the stationary airfoil 12, as shown in full lines in Figs. 2 to 4 inclusive, the relative movement of the air when the airplane is in flight will be across flat faces 31 past corners or shoulders 33, and then across flat faces 29. In passing across the faces 31 and 29 the movement of air will not produce lateral aerodynamic forces. There will, however, be aerodynamic effects produced at or adjacent the shoulders 33, but in view of the fact that the shoulders 33 lie on opposite sides of the hinge axis 14, the aerodynamic forces thus produced will not tend to rotate the movable airfoil 13, and accordingly the directional oscillation referred to in the introduction of this application is practically eliminated.

As shown in Fig. 6, the essential characteristics of design disclosed in Fig. 5 are departed from very slightly; that is, the radius of the leading edge 19 is reduced slightly below the value $$\frac{t}{2}$$

and by curved surfaces 36 the leading edge or nose 19 is merged with parallel faces 24 which extend substantially to the hinge plane h—h. The side faces 29 of the rearward portion 28 are extended straight from the trailing edge 18 to a point close to the hinge plane h—h and are joined with the faces 24 through curved faces 37 which lie on opposite sides of the hinge axis 14, or, in other words, are centralized on the hinge plane h—h. As the air stream passes these curved surfaces 37 when the movable airfoil 13 is in neutral position, the aerodynamic forces or lifts produced thereby, being applied directly to the hinge of the movable airfoil instead of in eccentric relation to the hinge, do not produce rotation of the movable airfoil 13.

The hinge axis 14 is set at such distance rearwardly from the leading edge 19 that the forward portion 27 of the movable airfoil 13 will rotate into the air stream on one side of the control member 11 as the rear portion 28 swings into the air stream on the opposite side. Being blunt in form and having parallel faces 31 disposed ahead of the hinge plane h—h, the forward or nose portion 27 immediately advances into the air stream as rotation of the movable member 28 is started. As the angle of the rear member 13 relative to the front member 12 increases, the projection of the front portion 27 into the air stream, or, in other words, beyond the rearwardly projected plane of the side face 24 of the member 12, increases. The dimension c of the forward portion 27 is so proportioned that in co-operation with the blunt curvature of the forward portion 27 an aerodynamic lift will be exerted or produced by the passage of the air relative to the projected forward portion 27 of the movable airfoil 13, sufficient to substantially balance the force exerted against the rearward portion 28 to rotate the same in a counter direction. For example, when the airfoil 13 is in the position shown by dotted lines 40 of Fig. 2, aerodynamic forces acting thereon will tend to rotate the member 13 in anti-clockwise direction, but the aerodynamic lift on the projected forward portion indicated by dotted lines 41 will exert a rotative force in clockwise direction which will substantially balance the anti-clockwise force in all angular positions of the movable airfoil 13. It is to be here noted that the projection e is variable from the lower or inner end of the member 13 to the upper or outer end thereof, and is proportionate to the variations in the dimensions a, b, c, and d. Accordingly, as the rearward portion 28 of the member 13 decreases in size from the lower to the upper end thereof, the size of the forward portion 27 and its projection e into the air stream decrease proportionately so that in each horizontal plane of the movable airfoil 13 the forces are substantially balanced.

My invention has been fully developed and tested in actual use and the tests which have been made are positive proof of the vast superiority of my invention over control means used in the prior art. In order to better illustrate the effective manner in which my invention functions and to show the superiority of my invention over prior art devices, reference will now be made to Figs. 7, 8, and 9, in which in the left-hand view the conventional design of control means is illustrated and in the right-hand view the control means of my invention is illustrated. In each of these views the front stationary airfoil is represented by the numeral 12, the rear movable airfoil is represented by the number 13, and the axis or hinge line of the movable airfoil is represented by the numeral 14. Fig. 7 represents the movable airfoil 13 in neutral or zero angular position. Fig. 8 represents the movable airfoil in a five-degree angular position, while Fig. 9 shows the movable airfoil in a twenty-degree angular position.

The effectiveness of any balance section is, for the purpose of illustration, simply defined as the area forward of the hinge line which is acted upon by direct, non-turbulent airflow, multiplied by the average moment arm of this area about the hinge. If we assume uniform force over this effective area, and since the area in all cases illustrated extends back to the hinge line, then the moment arm of the area will be one-half of its fore and aft dimensions. Thus, in each of the views contained in Figs. 7, 8, and 9, the value of "A" will be twice the numerical value of the moment arm as dimensioned.

With these premises established, a comparison of the difference in action between the conventional type of control means and the control means of my invention can readily be determined from the following chart, which gives the comparative values of the two designs when the movable airfoils are in similar angular positions.

normally) is so low that in order to get sufficient balance it has often been necessary to increase

| Angular deflection of control surface | Conventional design | | | | Design of my invention | | | |
| --- | --- | --- | --- | --- | --- | --- | --- | --- |
| | Arm | A | Arm × A = Bal. | % of max. Bal. | Arm | A | Bal. | % of max. Bal. |
| Fig. 7   0° (in neutral) | 3 | 6 | 18 | 3.15% | 9 | 18 | 162 | 45.2% |
| Fig. 8   5° (normal use) | 9 | 18 | 162 | 28.4% | 10 | 20 | 200 | 55.8% |
| Fig. 9   20° (maneuvers) | 17 | 34 | 578 | 100.0% | 13 | 26 | 358 | 100.0% |

In the above chart the figures in the columns marked "% of max. Bal." do not refer to the percentage of the force required to actuate the control means which has been counterbalanced, but refer to the percentage of the portion forward of the hinge line on the control means which is effective for the position of the control surface indicated. In other words, when the control surface is in a twenty degree angular position, as shown in Fig. 9, the balancing area is 100% effective; that is, the maximum balancing force has been obtained.

Comparing the two types of control means, it will be seen that in neutral position in the conventional type the balancing area is only 3.15% effective, while in the design of my invention it is 45.2% effective. And in the conventional design when the control means is in a 5° angular position, the balancing area is 28.4% effective, while in my invention the balancing area is 55.8% effective. It will therefore be seen that in the conventional design the balancing effect is negligible at small angular positions, with the result that there is but little balancing effect in those positions.

This, of course, means that the force required to operate the control means, or control surface as it is sometimes called, is but little counterbalanced at small angular positions, while it is considerably counterbalanced at greater angular positions. This results in a condition of non-uniformity in the operation of the control surface. In the control means of my invention there is a substantial balancing effect even at small angular positions, and this balancing effect increases proportionately as the force required to operate the control surface increases, with the result that there is a proportional counterbalance of the operating force at all times, and consequently the pilot may operate the control means with a "feel" which rather accurately indicates to him the position and effectiveness of the control surface.

The design and area of the balance surface in my invention may be devised so that at 100% effectiveness it will reduce the control force which would be required with no balancing effect, to some definite fraction of the force, say, for example, 20%. Since the control force (unbalanced) decreases as the angular position approaches zero, I have designed the balance area so that its effective area decreases also, and in any position the balance force will bear substantially the same ratio to the control force (unbalanced) as in any other position. With this design the force which the pilot must exert to operate the control means is but a fraction of the unbalanced control force and increases substantially proportionally with the increase of angular position of the control means.

With the conventional balance design the effectiveness at low angles (which are mostly used normally) is so low that in order to get sufficient balance it has often been necessary to increase the area forward of the hinge line to such an extent that a tendency to overbalance at a large angular deflection of the control means would result.

It will therefore be seen that in the control means of my invention it is possible to obtain a greater balance effectiveness at small angular positions with the same effectiveness at large angular positions, and that as a result thereof the control means will have a definite and accurate feel which will enable the pilot to accurately operate the control means and to know by the force or change in force required to move the control means into different angular positions, the angular position and the effectiveness of the control means.

Above the plane 4—4 of Fig. 1, the trailing edge 23 of the stationary airfoil 12 and the leading edge 19 of the hinged airfoil 13 depart from the line 17 and are angled rearwardly so that the trailing edge 23 substantially intercepts the hinge axis 14. The outer end of the hinge space 43 is in this manner carried back beyond the position in which ice initially collects, thereby substantially avoiding the formation of ice on the forward portion of the movable airfoil 13 and on the rearmost portion of the stationary airfoil 12, which would interfere with its operation.

The leading edge of the movable surface is cut back to substantially eliminate the possibility of overbalance caused by the formation of ice on the forward portion of the movable surface.

In the design of my invention the balance area at the upper end of the movable surface where the air-stream is approached is reduced to zero so that should large amounts of ice collect on the leading edge of the stationary airfoil and build back onto the upper end of the movable airfoil, there will be no appreciable overbalancing since there will be no balance area at that point for the ice to adhere to.

In Fig. 10, I have illustrated an alternative form of my invention in which the numerals employed in other views have been applied. In this form of my invention the surfaces 20 are curved at their forward parts but at their rearward parts are made flat, and from the plane 60 to the trailing edge of the stationary airfoil 12 these surfaces 20 are in the form of plane surfaces 61. They are, furthermore, positioned so that they extend in the same plane as the surfaces 29 of the movable airfoil 13 when the movable airfoil 13 is in normal or zero angular position. By making the portions 61 of the surfaces 20 flat the air flowing rearwardly is conditioned or rendered less turbulent and caused to flow in substantially a straight line. In this manner effectiveness of the invention may be improved.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In a control means for an aerial vehicle of the character described, the combination of: a front airfoil having a leading edge and a trailing edge; and a rear airfoil behind the trailing edge of said front airfoil, said rear airfoil having a leading portion which is substantially blunt, and said rear airfoil being hinged on an axis disposed to the rear of its leading edge such distance that said blunt leading portion will project into the air stream passing said front airfoil as said rear airfoil is rotated from neutral position, said rear airfoil having side faces which are non-convex in rearward direction and which converge to a trailing edge.

2. In a control means for an aerial vehicle of the character described, the combination of: a front airfoil having a leading edge and a trailing edge; and a rear airfoil behind the trailing edge of said front airfoil, said rear airfoil having a leading portion which is substantially blunt, and said rear airfoil being hinged on an axis located in a hinge plane which is disposed to the rear of its leading edge such distance that said blunt leading portion will project into the air stream passing said front airfoil as said rear airfoil is rotated from neutral position, said rear airfoil having parallel side faces in front of said hinge plane and having side faces extending rearwardly from said hinge plane which are non-convex in rearward direction and which converge to a trailing edge.

3. In a control means for an aerial vehicle of the character described, the combination of: a front airfoil having a leading edge and a trailing edge; and a rear airfoil behind the trailing edge of said front airfoil; said rear airfoil having a leading portion which is substantially blunt, and said rear airfoil being hinged on an axis located in a hinge plane which is disposed to the rear of its leading edge such distance that said blunt leading portion will project into the air stream passing said front airfoil as said rear airfoil is rotated from neutral position, said rear airfoil having a blunt rounded nose merging with substantially parallel side faces which extend substantially to said hinge plane and having side faces extending rearwardly from said hinge plane which are non-convex in rearward direction and which converge to a trailing edge.

4. In a control means for an aerial vehicle of the character described, the combination of: a front airfoil having a leading edge and a trailing edge, the side faces of said front airfoil being substantially parallel adjacent said trailing edge; and a rear airfoil behind the trailing edge of said front airfoil, said rear airfoil having a leading portion which is substantially blunt and of substantially the same thickness as the trailing portion of said front airfoil, and said rear airfoil being hinged on an axis located in a hinge plane which is disposed to the rear of its leading edge such distance that said blunt leading portion will project into the air stream passing said front airfoil as said rear airfoil is rotated from neutral position, said rear airfoil having a blunt rounded nose merging with substantially parallel side faces which extend substantially to said hinge plane and having side faces extending rearwardly from said hinge plane which are non-convex in rearward direction and which converge to a trailing edge.

5. In a control means for an aerial vehicle of the character described, the combination of: a stationary airfoil having a leading edge and a trailing edge, said stationary airfoil varying gradually in size from one cross-sectional plane through said airfoil extending substantially parallel to the direction of flight thereof to another; and a movable airfoil rotatable on an axis disposed in a hinged plane behind the trailing edge of said stationary airfoil, said movable airfoil being so formed that it will have a portion forward of said hinge plane and a portion rearward of said hinge plane, said portions both varying in size between said planes in like proportion to the variation in size of said stationary airfoil.

6. In a control means for an aerial vehicle of the character described, the combination of: a stationary airfoil having a leading edge and a trailing edge, said stationary airfoil varying gradually in size from one cross-sectional plane through said airfoil extending substantially parallel to the direction of flight thereof to another; and a movable airfoil behind the trailing edge of said stationary airfoil, said movable airfoil having a blunt leading edge and being rotatable on an axis disposed in a hinge plane set sufficiently to the rear of the leading edge of said movable airfoil that the portion of said movable airfoil forward of said hinge plane will move into the air stream which passes said stationary airfoil as said movable airfoil is rotated from its neutral position, the portions of said movable air foil forward of and rearward of said hinge plane both varying in size between said planes in like proportion to the variation in size of said stationary airfoil.

7. Control means of truncated triangular form adapted to extend from the structure of an air vehicle, comprising: a stationary airfoil having a leading edge and a trailing edge, said stationary airfoil varying gradually in size from one cross-sectional plane through said airfoil extending substantially parallel to the direction of flight thereof to another; and a movable airfoil behind the trailing edge of said stationary airfoil, said movable airfoil having a blunt leading edge and being rotatable on an axis disposed in a hinge plane set sufficiently to the rear of the leading edge of said movable airfoil that the portion of said movable airfoil forward of said hinge plane will move into the air stream which passes said stationary airfoil as said movable airfoil is rotated from its neutral position, the portions of said movable airfoil forward of and rearward of said hinge plane both varying in size between said planes in like proportion to the variation in size of said stationary airfoil.

8. In control means of the character described: a movable control airfoil having an axis of rotation on a hinge plane set to the rear of its leading edge and having a relatively blunt portion forward of said hinge plane comprising a rounded nose portion merging into flat faces which extend rearwardly in substantially parallel relation toward said hinge plane; and a portion rearward of said hinge plane having substantially flat side faces which converge rearwardly to a relatively sharp trailing edge, said forward and rearward portions being gradually and proportionately varied in both thickness and longitudinal dimension from one longitudinal plane through said airfoil to another longitudinal plane extending therethrough.

9. An airfoil for an aerial vehicle, comprising: a body having a leading edge and a trailing edge, with a hinge plane set rearwardly from said leading edge a distance greater than one-half the greatest thickness of said body, said hinge plane dividing said body into a front portion including said leading edge and a rear portion including said trailing edge, said front portion being blunt and having substantially parallel side faces adjacent said hinge plane, and said rear portion having side faces which extend substantially from said hinge plane to said trailing edge without convex curvature.

10. An airfoil for an aerial vehicle, comprising: a body having a leading edge and a trailing edge, with a hinge plane set rearwardly from said leading edge a distance greater than the greatest thickness of said body, said hinge plane dividing said body into a front portion including said leading edge and a rear portion including said trailing edge, said front portion being blunt and having substantially parallel side faces adjacent said hinge plane, and said rear portion having side faces which extend substantially from said hinge plane to said trailing edge without convex curvature, the rearward portions of said side faces of said front portion merging with the forward portions of said side faces of said rear portion through curved surfaces substantially centralized with respect to said hinge plane.

11. An airfoil for an aerial vehicle, comprising: a body having a leading edge and a trailing edge, with a hinge plane set rearwardly from said leading edge a distance greater than the greatest thickness of said body, said hinge plane dividing said body into a front portion including said leading edge and a rear portion including said trailing edge, said front portion having a rounded leading edge merging with substantially parallel side faces which extend rearwardly substantially to said hinge plane, and said rear portion having side faces which extend substantially from said hinge plane to said trailing edge without convex curvature, the rearward portions of said side faces of said front portion merging with the forward portions of said side faces of said rear portion through curved surfaces substantially centralized with respect to said hinge plane.

12. In a control means for an aerial vehicle of the character described, the combination of: a front airfoil having a leading edge and a trailing edge; and a rear airfoil behind the trailing edge of said front airfoil, said rear airfoil having a leading portion which is substantially blunt, and said rear airfoil being hinged on an axis disposed to the rear of its leading edge such distance that said blunt leading portion will project into the air stream passing said front airfoil as said rear airfoil is rotated from neutral position, said rear airfoil having side faces which are non-convex in rearward direction and which converge to a relatively sharp trailing edge, and said front airfoil having side faces the rearward parts of which are plane and disposed in the same converging angularity as said side faces of said rear airfoil.

13. In a control means for an aerial vehicle of the character described, the combination of: a front airfoil having a leading edge and a trailing edge; and a rear airfoil behind said front airfoil, having an axis of rotation on a hinge plane set to the rear of its leading edge and having a forward portion disposed in front of said hinge plane and a rearward portion which tapers rearwardly, disposed to the rear of said hinge plane, said forward and rearward portions of said rear airfoil being varied proportionately in airfoil section from one cross-sectional plane through said airfoil, extending substantially parallel to the direction of flight and substantially perpendicular to the hinge plane, to other such planes thereof and maintaining substantially the same contour.

14. In a control means for an aerial vehicle of the character described, the combination of: a front airfoil having a leading edge and a trailing edge; and a rear airfoil behind said front airfoil, having an axis of rotation on a hinge plane set to the rear of its leading edge and having a forward portion disposed in front of said hinge plane and a rearward portion which tapers rearwardly, disposed to the rear of said hinge plane, said forward and rearward portions of said rear airfoil and said front airfoil being varied proportionately in airfoil section from one cross-sectional plane through said airfoils, extending substantially parallel to the direction of flight and substantially perpendicular to the hinge plane, to other such planes thereof and maintaining substantially the same contour.

15. In a control means for an aerial vehicle of the character described, the combination of: a front airfoil having a leading edge and a trailing edge; and a rear airfoil behind said front airfoil, having an axis of rotation on a hinge plane set to the rear of its leading edge and having a forward portion disposed in front of said hinge plane and a rearward portion which tapers rearwardly, disposed to the rear of said hinge plane, said front airfoil and said rear airfoil being varied proportionately in airfoil section from one cross-sectional plane through said airfoils, extending substantially parallel to the direction of flight and substantially perpendicular to the hinge plane, to other such planes thereof and maintaining substantially the same contour.

16. In a control means for an aerial vehicle of the character described, the combination of: a front airfail having a leading edge and a trailing edge; and a rear airfoil behind said front airfoil, having an axis of rotation on a hinge plane set to the rear of its leading edge and having a forward portion disposed in front of said hinge plane and a rearward portion which tapers rearwardly, disposed to the rear of said hinge plane said forward and rearward portions of said rear airfoil being varied proportionately in chord from one cross-sectional plane through said airfoil, extending substantially parallel to the direction of flight and substantially perpendicular to the hinge plane, to other such planes thereof and maintaining substantially the same contour.

17. In a control means for an aerial vehicle of the character described, the combination of: a front airfoil having a leading edge and a trailing edge; and a rear airfoil behind said front airfoil, having an axis of rotation on a hinge plane set to the rear of its leading edge and having a forward portion disposed in front of said hinge plane and a rearward portion which tapers rearwardly, disposed to the rear of said hinge plane, said forward and rearward portions of said rear airfoil and said front airfoil being varied proportionately in chord from one cross-sectional plane through said airfoils, extending substantially parallel to the direction of flight and substantially perpendicular to the hinge plane, to other such planes thereof and maintaining substantially the same contour.

18. In a control means for an aerial vehicle of the character described, the combination of: a front airfoil having a leading edge and a trailing edge; and a rear airfoil behind said front airfoil, having an axis of rotation on a hinge plane set to the rear of its leading edge and having a forward portion disposed in front of said hinge plane and a rearward portion which tapers rearwardly, disposed to the rear of said hinge plane, said front airfoil and said rear airfoil being varied proportionately in chord from one cross-sectional plane through said airfoils, extending substantially parallel to the direction of flight and substantially perpendicular to the hinge plane, to other such planes thereof and maintaining substantially the same contour.

19. In a control means for an aerial vehicle of the character described, the combination of: a front airfoil having a leading edge and a trailing edge; and a rear airfoil behind the trailing edge of said front airfoil, said rear airfoil having a leading portion which is substantially blunt, and said rear airfoil being hinged on an axis located in a hinge plane which is disposed to the rear of its leading edge such distance that said blunt leading portion will project into the air stream passing said front airfoil as said rear airfoil is rotated from neutral position, said rear airfoil having converging side faces rearwardly of said hinge plane which meet in a trailing edge, and parallel side faces disposed between said blunt nose and said converging side faces.

20. In a control means for an aerial vehicle of the character described, the combination of: a front airfoil having a leading edge and a trailing edge; and a rear airfoil behind the trailing edge of said front airfoil, said rear airfoil having a leading portion which is relatively short and rounded, and said rear airfoil being hinged on an axis disposed to the rear of its leading edge such distance that said leading portion will project into the air stream passing said front airfoil as said rear airfoil is rotated from neutral position, said rear airfoil having side faces which are non-convex in rearward direction and which converge to a trailing edge.

21. In a control means for an aerial vehicle of the character described, the combination of: a front airfoil having a leading edge and a trailing edge; and a rear airfoil behind the trailing edge of said front airfoil, said rear airfoil having a leading portion which is relatively short and rounded, and said rear airfoil being hinged on an axis disposed to the rear of its leading edge, said rear airfoil having side faces which are disposed to the rear of the hinge plane of said rear airfoil, and which are non-convex in rearward direction and which converge to a trailing edge.

LEONARD EUGENE ROOT.